United States Patent [19]
Ibamoto et al.

[11] 3,754,183
[45] Aug. 21, 1973

[54] SYSTEM FOR CONTROLLING AN ELECTRIC OUTPUT WITH REDUCED RECOVERY TIME

[75] Inventors: Masahiko Ibamoto; Hisakatsu Kiwaki, both of Katsuta-shi, Japan

[73] Assignee: Hitachi Ltd., Tokyo, Japan

[22] Filed: Mar. 28, 1972

[21] Appl. No.: 238,785

[52] U.S. Cl. ........ 323/22 SC, 317/36 TD, 322/28 V
[51] Int. Cl. .............................................. G05f 1/40
[58] Field of Search .................... 323/20, 22 SC, 41; 317/36; 322/28 V; 318/619

[56] References Cited
UNITED STATES PATENTS
3,582,713    6/1971    Till.................................... 323/20 X

*Primary Examiner*—Gerald Goldberg
*Attorney*—Paul M. Craig, Donald R. Antonelli et al.

[57] ABSTRACT

In the control of an electric output with respect to a reference value, the gain of a control means is controlled or changed to a higher value when the difference between the prevailing value of the electric output and a reference value exceeds a predetermined value.

3 Claims, 4 Drawing Figures

SYSTEM FOR CONTROLLING AN ELECTRIC OUTPUT WITH REDUCED RECOVERY TIME

This invention relates to control systems and, more particularly, to control systems for controlling an electric output with reduced recovery time.

In systems where the electric output of a unit is controlled with respect to a reference value, when the electric output suddenly departs greatly from the reference level at such occasion as connecting an external load to the controlled unit, it is usually returned to the vicinity of the reference level only after a certain delay time.

The above delay time is required for the control means, because without any delay time involved in the control system would tend to be too sensitive in the normal operation during which the electric output does not sharply change but substantially follows the reference level. Therefore, a suitable delay time is provided in the control system of the above kind.

With a delay time involved in the operation of the control system itself, however, a certain time is required for the electric output from a suddenly changed value to reach the reference value. This time may be reduced by increasing the output, that is, the gain of the control system irrespective of the delay time of the control system. However, the gain of the system cannot be made too high from the standpoint of the stability thereof.

An object of the invention is to reduce the time required for the recovery of the controlled electric output without deteriorating the stability of the control system by so arranging as to provide a steady gain for the normal operation of the control system and change it to a higher value at the time of sudden change of the controlled electric output.

Another object of the invention is to provide a control system, which is simple in construction and inexpensive, and with which the control of the aforementioned kind may be obtained.

The invention features a control system for controlling an electric output with a reduced recovery time, which comprises a control means for controlling an electric output with respect to a reference value, a detecting means to detect the difference between said reference value and the prevailing value of said electric output, a non-sensitive region element to produce an output upon appearance of a predetermined output of said detecting menas, and a gain control means to control the gain of said control means according to the output of said non-sensitive region element.

The invention will become more apparent from the following description in connection with the accompanying drawings, in which.

Figure 1:
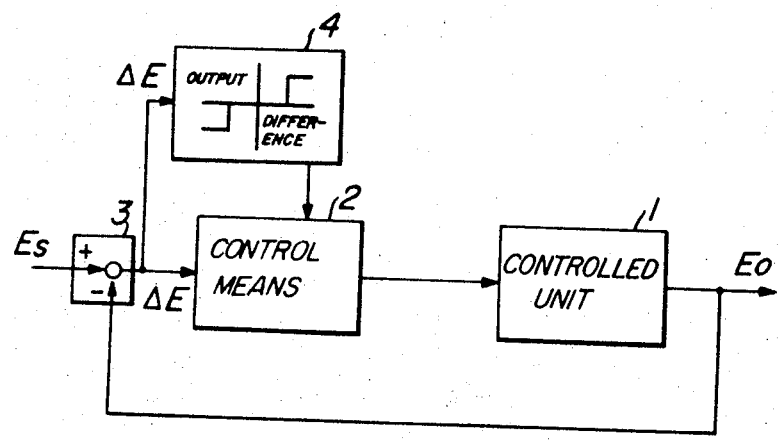
FIGS. 1 and 2 are block diagrams to illustrate the principles underlying the invention.

Referring to FIG. 1, reference numeral 1 designates a controlled unit providing electric output $E_o$, and numeral 2 a control means controlling the unit 1. Coupled to the input side of the control menas 2 is a detector 3 detecting the difference $\Delta E$ between reference voltage $E_S$ and output voltage $E_o$.

the above control loop, the output $E_o$ is controlled to follow the reference voltage $E_S$.

The output of the detector 3 is also coupled to a non-sensitive region element 4 which provides an output only when the output $\Delta E$ of the detector 3 is above a predetermined level. The gain of the control means 2 is adapted to be changed with the output of the non-sensitive region element 4.

In the operation of the above construction, while the output $E_o$ of the control unit 1 controlled by the control means 2 follows the reference voltage $E_S$ without any external disturbance, the output $\Delta E$ of the detector 3 is extremely small, so that the non-sensitive region element 4 provides no output.

Under this normal condition, therefore, the control is accomplished with steady gain set to the control means.

At the moment of connecting an external load (not shown) to the output side of the controlled unit 1, its output $E_o$ greatly departs from the reference level $E_S$ and gets beyond the non-sensitive region of the element 4. As a result, the element 4 produces an output, with which the gain of the control means 2 is controlled or changed to a higher value. In this manner, the output $E_o$ greatly departed from the reference level $E_S$ can be quickly returned to the reference level. With the recovery of the output $E_o$ the output $\Delta E$ of the detector 3 gets small, so that the previous output of the non-sensitive region element 4 is reduced to zero, whereupon the increased gain of the control means 2 is reduced to the initial value.

As has been described, according to the invention the gain of the control means is set to a suitable value from the standpoint of the stable operation of the control means under normal conditions, while it is changed to an increased value from the standpoint of quickly recovering the output $E_o$ rather than the stable operation at the time of a sudden change of the output $E_o$.

In the above system where the output $E_o$ is controlled to follow the reference level $E_S$, the difference $\Delta E$ (= $E_S - E_o$) between the reference $E_S$ and output $E_o$ can be either positive or negative. When the difference $\Delta E$ is positive the output $E_o$ is increased, while with a negative difference the output is reduced. In the former case, the gain of the control means 2 is said to be positive, while in the latter case it is said to be negative. Accordingly, in order to be able to quickly return the output $E_o$ from a suddenly changed value to the reference level, the gain of the control means 2 may be increased in the positive direction when the difference $\Delta E$ exceeds a predetermined positive level, while it may be increased in the negative direction when the difference gets below a predetermined negative level.

While in the preceding example the gain of the control means 2 itself is directly changed with the output of the non-sensitive region element 4 serving as means to control the gain of the control means 2, similar results may also be obtained with different arrangements to be described below.

Figure 2:
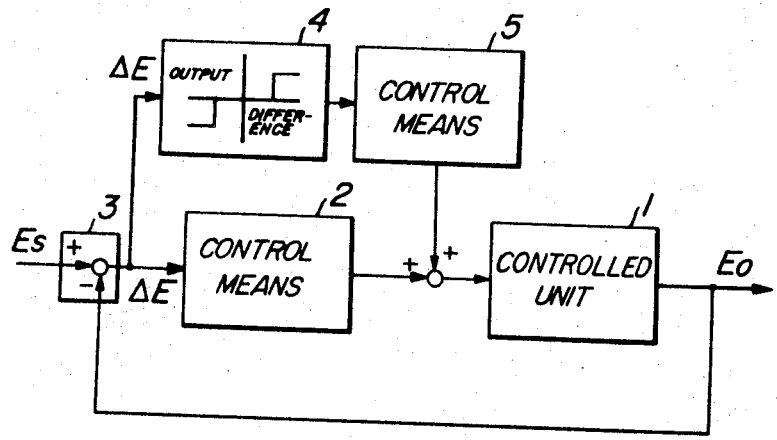

FIG. 2 shows an example of such alternative arrangements. In this arrangement, a second control means 5 is separately provided in parallel with the first control means 2. The control means 5 is controlled by the output of the non-sensitive region element 4 and its output is additively combined with the output of the control means 2.

In this case, the non-sensitive region element 4 serves as a kind of switch. The addition of the output of the control means 5 to the output of the control means 2 has the same effects as increasing the output of the control means 2 in other words, it has the same effects as will be obtained by increasing the gain of the overall control means.

As a second alternative, the gain of the control means 5 in FIG. 2 may be set to a higher value than the gain of the control means 2, and both the control means may be arranged to be switched one over to the other according to the output of the non-sensitive region element 4.

While the above arrangement is provided with two control means 2 and 5 which are switched one over to the other, it is also possible to control the gain stepwise by providing many more control means.

The afore-described systems of FIGS. 1 and 2 may be extensively employed in the control of current or voltage as the electric output.

Figure 3:
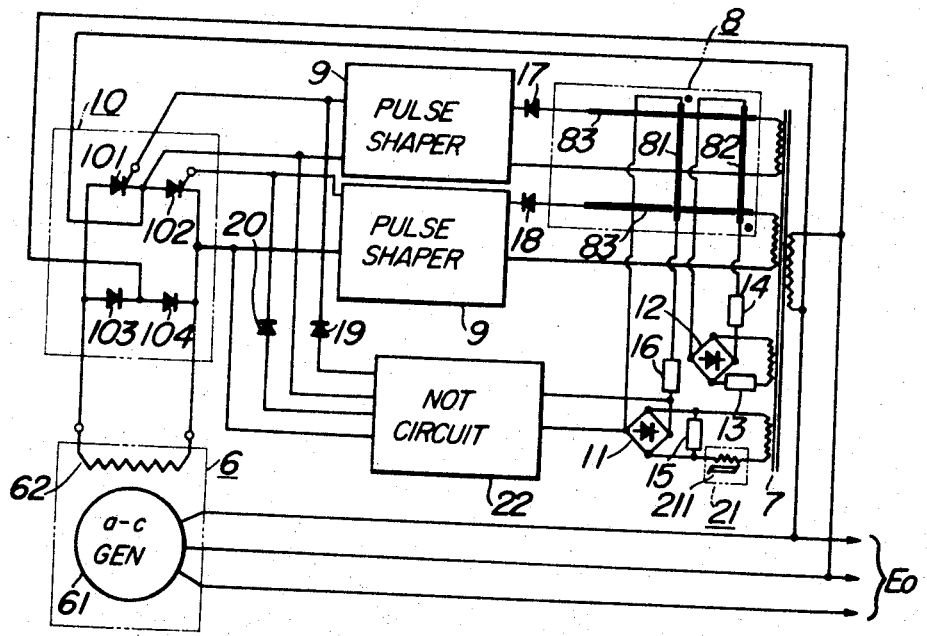
FIG. 3 is a schematic showing an embodiment of the invention.

FIG. 3 shows a practical adoption of the system of FIG. 2 in the voltage control for an a-c generator.

Referring to FIG. 3, reference numeral 6 designates an a-c generator with armature 61 and field winding 62, numeral 7 a transformer, numeral 8 a magnetic phase shifter comprising a control winding 81, a bias winding 82 and output windings 83, and numeral 9 pulse shapers for shaping the output of the phase shifter 8. Numeral 10 designates a thyristor circuit to control the voltage across the field winding 62 of the generator 6. It comprises two thyristors 101 and 102, and two diodes 103 and 104. Numerals 11 and 12 designate full-wave rectifiers consisting of diodes, numerals 13 to 16 resistors, and numerals 17 to 20 diodes. Numeral 21 designates a detector to detect the difference $\Delta E$ between the reference voltage $E_S$ and output voltage $E_O$, and numeral 22 a NOT circuit according to the invention.

The construction described above constitutes a control system for a self-excited a-c generator. It also constitutes a reference voltage generator where the ratio between the output voltage and frequency is controlled to a constant value by using a saturable reactor 211 for the difference detector 21.

To describe the operation of the circuit of the above construction, a constant output frequency is assumed to simplify the description.

Figure 4:
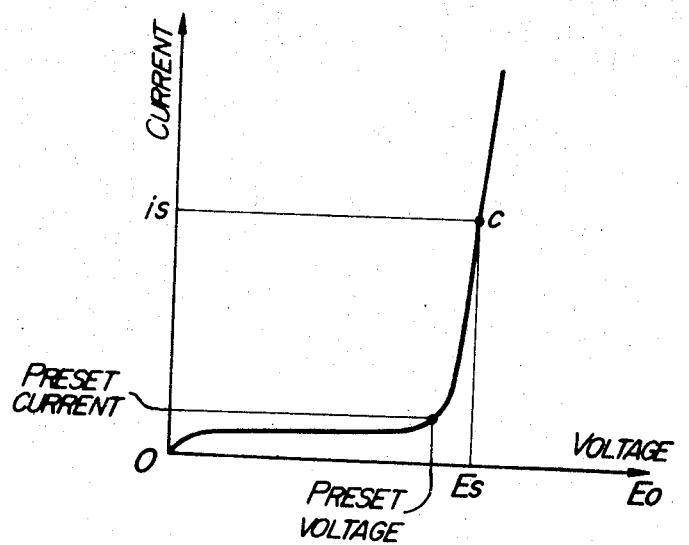
FIG. 4 is a graph showing a current-voltage characteristic of an element of the system of FIG. 3.

FIG. 4 shows a current-voltage characteristic of the saturable reactor 211. A working point is preset at C at which the controlled system is balanced. The terminal voltage $E_S$ across the saturable reactor 211 corresponding to the working point C does not appreciably vary with slight variations in the output voltage $E_O$, so that it can be used as a reference voltage. The current $i_S$ through the saturable reactor 211 is substantially proportional to the difference between the reference $E_S$ and output voltage $E_O$ for a range in the neighborhood of $E_S$. Accordingly, this current $i_S$ is adapted to flow through the control winding 81 of the phase shifter 8. The output of the phase shifter 8 is coupled through the pulse shapers 9 to the thyristor circuit 10 controlling the voltage across the field winding 62 of the generator 6, thus ultimately controlling the output voltage $E_O$ of the generator 6 to follow the reference value $E_S$.

If the current $i_S$ flowing through the saturable reactor 211 in proportion to the difference between the output voltage $E_O$ and the reference voltage $E_S$, falls below a predetermined upper limit of the non-sensitive region as a result of a sudden fall of the output voltage at the time of connecting an external load, the NOT circuit 22 provides an output to render the thyristors 101 and 102 in the thyristor circuit 10 conductive, thereby suddenly increasing the output voltage $E_O$ of the generator 6. Before or upon returning of the output voltage $E_O$ to the reference level $E_S$ the output of the NOT circuit 22 vanishes, and the subsequent control of the thyristor circuit 10 is done with the output of the magnetic phase shifter 8.

Since the thyristors 101 and 102 are rendered into full conduction independently of the output of the phase shifter 8 in an occasion of abnormal reduction of the output voltage $E_O$, the gain of the control system can be greatly increased in such a case.

In the system of FIG. 3 the gain control is provided only for the occasion of a sudden fall of the output voltage $E_O$ from the reference level, i.e., a positive difference $\Delta E$, and if the output voltage $E_O$ suddenly rises from the reference level, i.e., the difference $\Delta E$ is negative, the controlling of the output voltage $E_O$ is performed only by the phase shifter 8 and pulse shapers 9, which correspond to the control means 2 of FIG. 2, without such a gain control. It is, however, possible to provide a similar control to the case of a sudden fall of the output voltage even for the occasion of a sudden rise of the output voltage from the reference level with making a slight modification to the system of FIG. 3.

In the latter case, a detecting means to detect a certain predetermined upper limiting value of the output voltage $E_O$ and a circuit acting to reduce the output of the phase shifter 8 to zero may be separately provided.

The above description has been based on the assumption of a constant output frequency of the generator 6. Where the output frequency is variable, the terminal voltage across the saturable reactor 211 varies in proportion to the output frequency. In this case, the characteristic of FIG. 4 is shifted in a direction parallel to the axis of output voltage $E_O$ in proportion to the output frequency, so that the reference voltage $E_S$ varies in proportion to the frequency. Accordingly, it is possible to control the ratio between the output voltage and frequency of the generator 6 to a constant value. As mentioned earlier, the operation itself of the control system is the same irrespective of whether the output frequency is constant or variable.

Comparing the FIG. 2 system with the FIG. 3 system, the controlled unit 1 in FIG. 2 corresponds to the generator 6 and thyristor circuit 10 in FIG. 3, the control means 2 in FIG. 2 to the magnetic phase shifter 8 and pulse shapers 9 in FIG. 3, the detector 3 in FIG. 2 to the detector 21 in FIG. 3, and the non-sensitive region element 4 and the control means 5 in FIG. 2 to the NOT circuit 22 in FIG. 3. Also, the electric output $E_O$ and the reference value $E_S$ in case of FIG. 2 respectively correspond to the output voltage $E_O$ from the generator 6 and to the terminal voltage across the saturable reactor 211 in case of FIG. 3.

It will be easily understood from the above explanation that the embodiments of the control system according to the invention can be used advantageously for the cases where the controlling of an electric output with a reduced recovery time is desired only when the electric output suddenly falls to deviate from the reference value exceeding the predetermined value, i.e., when the difference $\Delta E$ is positive, where it is desired only when the electric output suddenly rises, i.e., the difference $\Delta E$ is negative, and where it is desired in both such a fall and a rise of the electric output.

As has been described in the foregoing, according to the invention it is possible to extremely reduce the time required for the recovery of the output of the controlled unit from a suddenly changed value by so arranging as to change the gain of the control system upon sudden change of the output of the controlled unit. Also, since a very steady gain is set for the normal run, with the gain being changed only at the time of sudden change of the output of the controlled unit, the control system can be very simple in construction.

What is claimed is:

1. A control system for controlling an electric output with a reduced recovery time comprising; generating means for generating said electric output, comparing means for comparing said electric output with a reference level to detect the difference therebetween and to provide an output in accordance with the difference, controlling means for controlling said generating means with a constant gain in accordance with the output of said comparing means when the output of said comparing means is not higher than a predetermined level, a non-sensitive region element connected with said comparing means and said controlling means for increasing the gain of said controlling means only when the output of said comparing means exceeds said predetermined level, whereby said generating means is controlled by said controlling means with the increased gain when said electric output deviates from said reference level exceeding a predetermined value.

2. A control system according to claim 1, wherein said controlling means includes at least two controlling units connected in parallel with each other, one of said controlling units producing an output for controlling said generating means when the output of said comparing means is not higher than said predetermined level, the other being connected to said non-sensitive region element, said non-sensitive region element producing an output to be applied to said other controlling unit when the output of said comparing means exceeds said predetermined level, said other controlling unit producing in response to said output of said non-sensitive region element an output for controlling said generating means together with said output of said one controlling unit.

3. A control system according to claim 1, wherein said controlling means includes switching means and at least two controlling units providing different gains connected in parallel with each other, and said non-sensitive region element produces an outut to be applied to said switching means when the output of said comparing means exceeds said predetermined level, said switching means switching said controlling units in response to the output of said non-sensitive region element from one providing a lower gain to the other providing a higher gain.

* * * * *

UNITED STATES PATENT OFFICE
CERTIFICATE OF CORRECTION

Patent No. 3,754,183          Dated August 21, 1973

Inventor(s) Masahiko Ibamoto, et al

It is certified that error appears in the above-identified patent and that said Letters Patent are hereby corrected as shown below:

Priority data omitted. Should read:

--46 18752      Japan      March 31, 1971--

Signed and sealed this 18th day of December 1973.

(SEAL)
Attest:

EDWARD M. FLETCHER, JR.      RENE D. TEGTMEYER
Attesting Officer      Acting Commissioner of Patents